Nov. 16, 1937.  E. C. RANEY  2,099,499
ELECTRIC VULCANIZER
Filed Sept. 13, 1935  3 Sheets-Sheet 1

Inventor
Estel C. Raney
By W. S. McDowell
Attorney

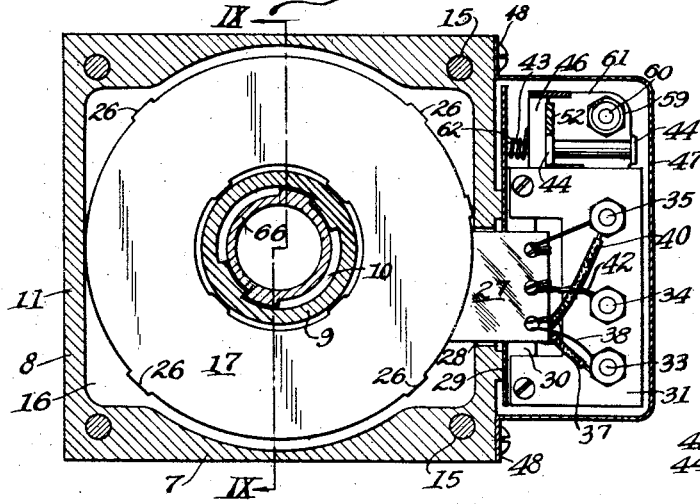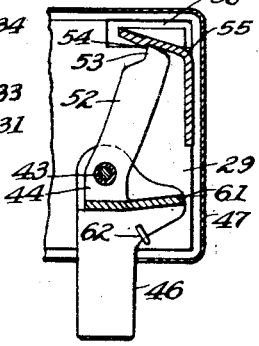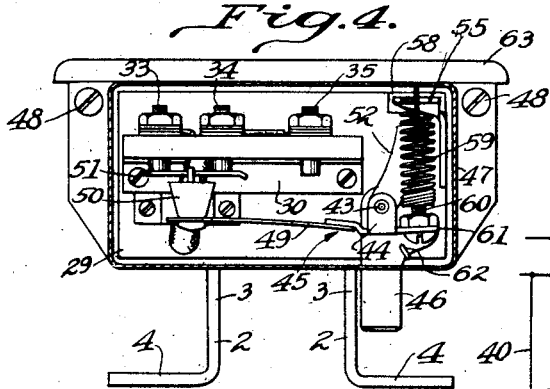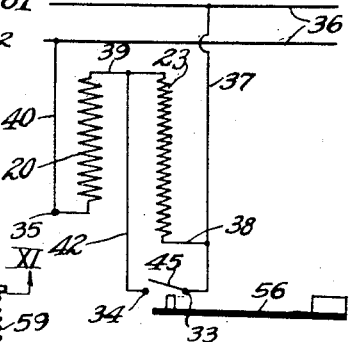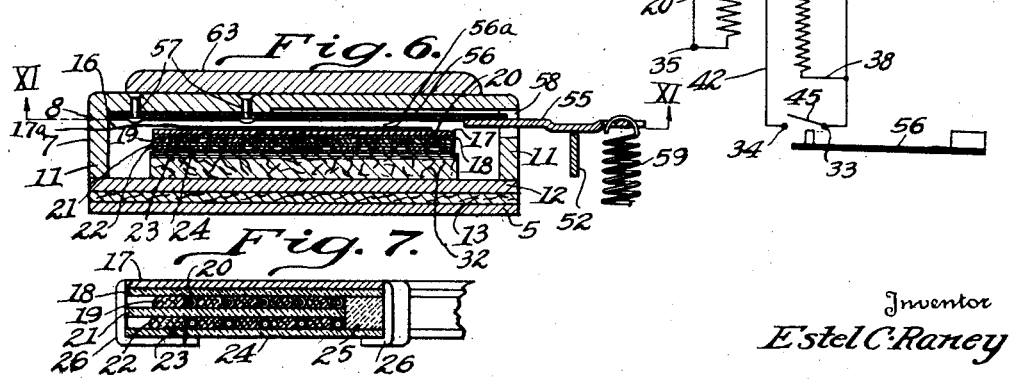

Nov. 16, 1937.  E. C. RANEY  2,099,499
ELECTRIC VULCANIZER
Filed Sept. 13, 1935  3 Sheets—Sheet 3
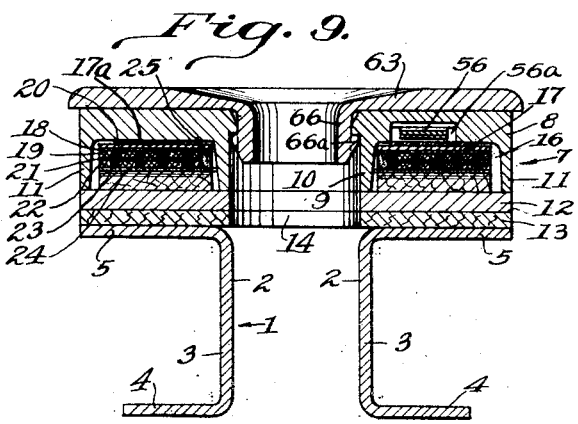
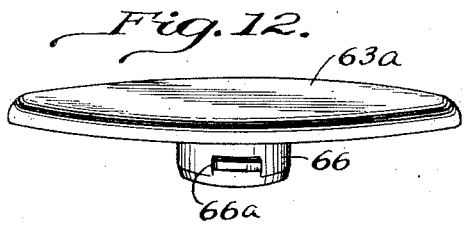
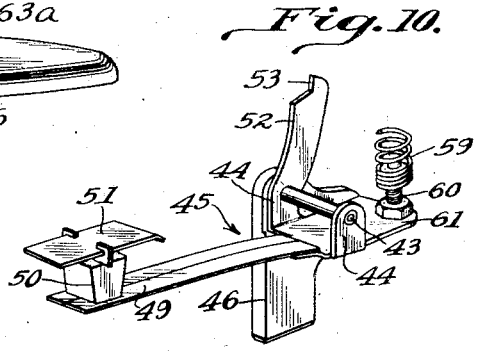
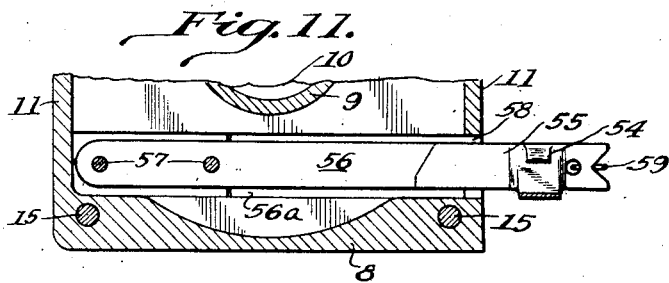
Inventor
Estel C. Raney
By W. S. M. Howell
Attorney Patented Nov. 16, 1937

2,099,499

UNITED STATES PATENT OFFICE 2,099,499

ELECTRIC VULCANIZER

Estel C. Raney, Columbus, Ohio, assignor to Ranco Incorporated, a corporation of Ohio Application September 13, 1935, Serial No. 40,466

7 Claims. (Cl. 219—19)

This invention relates to an improved electrically heated vulcanizer for use in the repair of rents, tears or openings in rubber or rubber-containing bodies, such as motor vehicle tires, inner tubes for tires, and the like.

It is the object of this invention to provide an electric vulcanizer wherein heat is applied to the vulcanizing surface of the vulcanizer until the temperature of the surface reaches a predetermined point whereupon the heating of the surface is automatically discontinued or modified.

An outstanding object of the invention resides in providing an electrically heated vulcanizer having a heater unit including a plurality of resistance or heater coils of different electrical values in combination with a thermally operated switch mechanism and a source of current supply, whereby the vulcanizing surface of the vulcanizer may be quickly raised to a predetermined vulcanizing temperature by the heater coil having the lower resistance value whereupon the heater coil having the higher resistance is automatically connected in series with the first said coil to reduce the heating effect of the heater unit on the vulcanizing surface to retard the normal cooling of the surface so that the material undergoing vulcanization will be thoroughly heated at the proper temperature to assure complete vulcanization thereof.

Another object of the invention is to provide in an electric vulcanizer a heating unit having a pair of heater coils of different resistances and a switch for controlling the flow of current through said coils whereby when the vulcanizer is not in active use current is directed through both coils so that the vulcanizing surface may be maintained at a temperature slightly below the vulcanizing temperature with the consumption of a comparatively small amount of current and when vulcanizing is to be accomplished the switch may be operated to direct current through the low resistance coil whereby the vulcanizing surface is quickly raised to a predetermined vulcanizing temperature, whereupon the switch automatically operates to direct current through both coils to reduce the heating effect of the heating unit on the surface.

It is still another object of the invention to provide in an electric vulcanizer a thermostatically operated switch wherein the thermostatic element is shielded from direct radiation of heat from the heater element of the vulcanizer.

It is also the object of this invention to provide an electric vulcanizer having a thermostatically operated switch means whereby the thermostatic element of the switch and the vulcanizing surface of the vulcanizer are maintained at substantially the same temperatures during all phases of operation of the vulcanizer.

The present invention constitutes a continuation-in-part of my prior application, Serial No. 709,385, filed Feb. 1, 1934.

For a further understanding of the invention, reference is to be had to the following description and the accompanying drawings, wherein:

Fig. 3 is a horizontal sectional view on the plane indicated by the line III—III of Fig. 2;

Fig. 4 is a vertical sectional view on the line IV—IV of Fig. 2;

Fig. 5 is a detail vertical sectional view disclosing the thermostatic latch means for retaining the switch mechanism in a position of circuit closure;

Fig. 6 is a vertical sectional view taken through the resistor base of the vulcanizer and disclosing the bi-metallic thermostat for controlling the operation of the resistor switch;

Fig. 7 is a detail sectional view taken through the resistor coils;

Fig. 8 is a diagrammatic view of the circuit arrangement in which the resistor coils are situated;

Fig. 9 is a vertical transverse sectional view on the plane indicated by the line IX—IX of Fig. 3;

Fig. 10 is a perspective view of the switch mechanism;

Fig. 11 is a horizontal sectional view on the plane indicated by the line XI—XI of Fig. 6;

Fig. 12 is a perspective view of a heat applying plate used when a plain patch is to be vulcanized.

Figure 1:
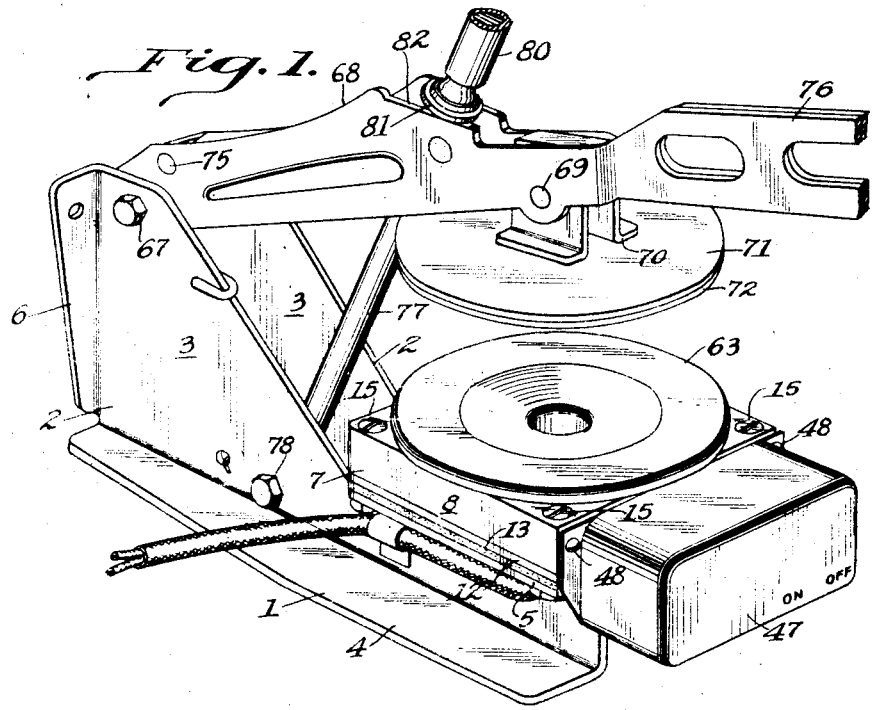
Fig. 1 is a perspective view of an electric vulcanizer constructed in accordance with the present invention, the stationary and movable shoes of the vulcanizer being shown in their separated or open positions.

My improved vulcanizer, in the preferred form thereof illustrated in the accompanying drawings, comprises a frame 1, which may consist of a pair of duplicate, reversely arranged metallic stampings 2, the latter being formed to include vertical side walls 3 which terminate at their lower edges in outwardly and laterally directed base flanges 4 and along their upper edges in outwardly directed horizontal supporting flanges 5. The rear vertical edges of the walls 3 terminate in out-turned vertical flanges 6 which possess a somewhat wedge-shaped configuration, enabling the flanges 6 to be removably received, for instance, in a correspondingly shaped socket of a wall bracket (not shown). Also, the flanges 6 may be perforated to provide for the direct connection of the vulcanizer frame to a suitable vertical supporting wall. Again, the vulcanizer may be mounted on the upper surface of a table, bench or the like by the flanges 4.

Secured to the flanges 5 of the vulcanizer frame is a stationary resistor casing 7 which is formed to include a substantially rectangular metallic member 8 formed centrally with a depending collar 9 and a vertical axial opening 10, together with depending marginal walls 11. Arranged to cover the bottom of the housing member 8 is a metallic closure plate 12 and disposed between the plate 12 and the flanges 5 of the vulcanizer frame is a plate 13 of a suitable heat insulating material, the plates 12 and 13 being provided with axial openings 14 which register with the opening 10 in the housing member 8. These parts are retained in assembled order by the provision of vertical screws 15 which are arranged in the corner portions of the resistor casing and have their lower threaded ends received within threaded openings provided in the frame flanges 5. By this construction, an internal ring-like chamber 16 is provided in the housing member 8 for the reception of the electrically heated resistor coils of the vulcanizer.

These resistor coils are embodied in a substantially ring-shaped unit comprising an upper thin metallic plate 17 of high thermal conductivity and against the under side of which is placed a thin sheet 18 of mica or other dielectric substance. Contacting with the under side of the dielectric sheet 18 is an asbestos ring 19 in which is embedded a spirally arranged, helically wound, primary resistance coil 20. Engaging the under side of the ring 19 and the coil 20 is a second or intermediate ring-like disk 21 of mica, and disposed to engage with the under side of the disk 21 is a second asbestos ring 22 in which is embedded a spirally disposed, helically wound, secondary resistor coil 23, which possesses greater resistance values to the flow of electric current than the primary coil 20. To retain the coil 23 in place, is a bottom sheet 24 of mica, which possesses the same general dimensions as the upper sheet 18. The intermediate sheet 21 possesses a greater internal diameter than the sheets 18 and 24 in order to provide for the reception of a ceramic insulating ring 25. To hold these parts together in rigid assembly, the metallic plate 17 is provided with downwardly directed fingers 26, which are struck from the inner and outer edges of the disk-like plate 17. These fingers have their lower ends bent to engage with the bottom surfaces of the mica sheet 24 so that the various parts of the resistor may be assembled and maintained as a unit.

This unit is positioned in the chamber 16 of the resistor casing and surrounds the collar 9 of the housing member 8, with the metallic plate 17 of the resistor unit toward the bottom surface of the flat upper wall of the member 8 and separated from the wall by a thin ring-like disk of asbestos 17a. The mica sheets 18, 21 and 24 are, as shown in Fig. 3, provided with laterally disposed extensions 27 which project through an opening 28 formed in the front marginal wall 11 of the metallic base member 8.

Secured to the front wall of the member 8 is a vertically disposed metallic plate 29 which is also provided with an opening in registration with the opening 28 for the reception of the extensions 27. The front of the plate 29 carries a stationary angle member 30, to which is secured a substantially U-shaped shelf 31 of an insulating material and the extensions 27 overlie the notch or recess formed in the shelf. As shown in Fig. 6, the resistor unit, which comprises the coils 20 and 23 is supported within the chamber 16 by a pad 32 of insulating material, the latter being disposed within the lower portion of the chamber 16 and is arranged between the plate 12 and the resistance unit.

Carried by the shelf 31 are binding posts 33, 34, and 35. Electric current from a suitable source of supply, such as a commercial power circuit, the lines of which are indicated at 36, has connected therewith a conductor 37 which extends to the binding post 33, which is connected by a lead 38 with the secondary, high resistance coil 23. From the coil 23, the current is directed, when the vulcanizer is inactive, through a lead 39 which extends to the primary coil 20 and a lead 40 extends from the other end of the coil 20 to the return line of the circuit 36. The lead 39, which unites the coils 20 and 23, is connected with the post 34 by means of a conductor 42. Normally, therefore, current may be said to pass from the source of supply by way of the conductor 37, the lead 38, thence through the high resistance secondary coil 23, the lead 39, thence through the primary coil 20 and back to the source of supply by way of the lead 40. The coil 23 by reason of its high resistance value becomes mildly heated in order that the heat transmitting parts of the vulcanizer may be maintained at a somewhat elevated temperature between successive operations of the vulcanizer, and principally to lengthen the time that the vulcanizing shoe is maintained at a vulcanizing temperature after the low resistance coil 20 has been rendered less active after heating the vulcanizing shoe to a predetermined temperature. The heat of coil 23 also prevents the vulcanizer from cooling to too great an extent between vulcanizing operations so as to retard its rapidity of operation. However, when a vulcanizing operation is started, the secondary resistance coil 23 is shunted, so that all of the current will flow through the primary resistance coil 20, which becomes highly heated and will quickly raise the temperature of the vulcanizing shoe substantially above the minimum vulcanizing temperature, whereupon the switch operates to render the high resistance coil 23 effective to prevent rapid cooling of the vulcanizing shoe.

To provide for the shunting of the secondary coil 23 when the vulcanizer is to be used, there is carried by the plate 29 a forwardly and horizontally projecting stud 43, which is located beyond the corresponding edge of the shelf 31. The stud 43 passes through registering apertures provided in upstanding ears 44 of a manually closable switch 45, the switch rocking about the axis afforded by the stud 43. In this instance, the switch is provided with a depending arm 46 of a suitable dielectric substance and is mounted for oscillation in a slot provided in the lower wall of a switch covering shell 47, which is detachably connected as at 48 to the metallic base 8. Formed with the switch 45, as a unitary part thereof, and arranged within the shell, is a resilient arm 49. This arm carries at its outer end an upstanding post 50 of insulating material, and to the upper end of which is swivelly connected for swinging movement a bridge 51. This bridge is adapted, when the switch is closed, to engage with the lower ends of the binding posts 33 and 34 in order to shunt the resistor coil 23, as shown diagrammatically in Fig. 8.

While the switch is adapted to be manually closed, means are provided for retaining the same in its position of closure and automatically effecting its release or opening when the vulcanizer attains a predetermined temperature. This is accomplished by providing the switch with an upstanding arm 52 which terminates at its upper end in a finger 53, the latter being formed for engagement with a shoulder 54 formed in connection with a metallic stamping 55. This stamping is secured to the outer end of a bi-metallic thermostatic strip 56 which has its inner ends secured as at 57 to the metallic base 8, the strip occupying a transverse recess 56a formed in the lower surface of the upper wall of the base 8 immediately adjacent to the resistor unit, the stamping 55 projecting through an opening 58 formed in the forward marginal wall 11 of the base 8 in alignment with the recess in which the strip 56 is positioned.

The recess 56a is of a depth somewhat greater than the thickness of the thermostatic strip 56 and is provided near its rear end with a shelf which forms a base for the reception of the thermostat. The plate 17 and asbestos disk extends across the recess 56a as shown in Fig. 9 and engages the under side of the upper wall of the base 8, leaving an air space between the under surface of the thermostat and the asbestos disk. This construction is employed to provide for the transmission of heat to the thermostat by conduction through the base 8 rather than directly from the heating element. In this manner, the actual temperature of the base 8 affects the thermostat.

Connected with the outer end of the stamping 55 is the upper end of a coil spring 59, the latter having its lower end connected with an adjustable header post 60 which is carried by a laterally directed wing 61 forming a part of the switch 45. Normally, the tendency of the spring 59 is to oscillate the switch so that the bridge 51 will be moved out of contact with the terminal posts 33 and 34. However, upon manual operation of the switch, the latter is rocked about the axis of the stud 43 against the resistance of the spring 59, thereby bringing the bridge 51 into circuit completing contact with the terminal posts 33 and 34.

The switch is retained in this position of closure by the engagement of the finger 53 on the arm 52 with the shoulder 54 of the stamping 55. This engagement is rendered positive by the presence of the spring 59. When the switch is thus closed, the full flow of current takes place through the primary coil 20 until the vulcanizer attains a predetermined temperature. At this time, the thermostatic strip 56 responds to the elevated temperatures and flexes sufficiently, in opposition to the force of the spring 59, to free the shoulder 54 from engagement with the finger 53. Then, in response to the action of the spring 59, the switch oscillates to assume its open position. The operation of the main spring 59 may be supplemented by an auxiliary spring 62 which is carried by the stud 43 and engages with the switch arm 46, the tendency of the spring 62 being to maintain the switch in its open position. The entire vulcanizer may be disconnected from the source of electrical supply through the usual plug and socket fittings.

Figure 2:
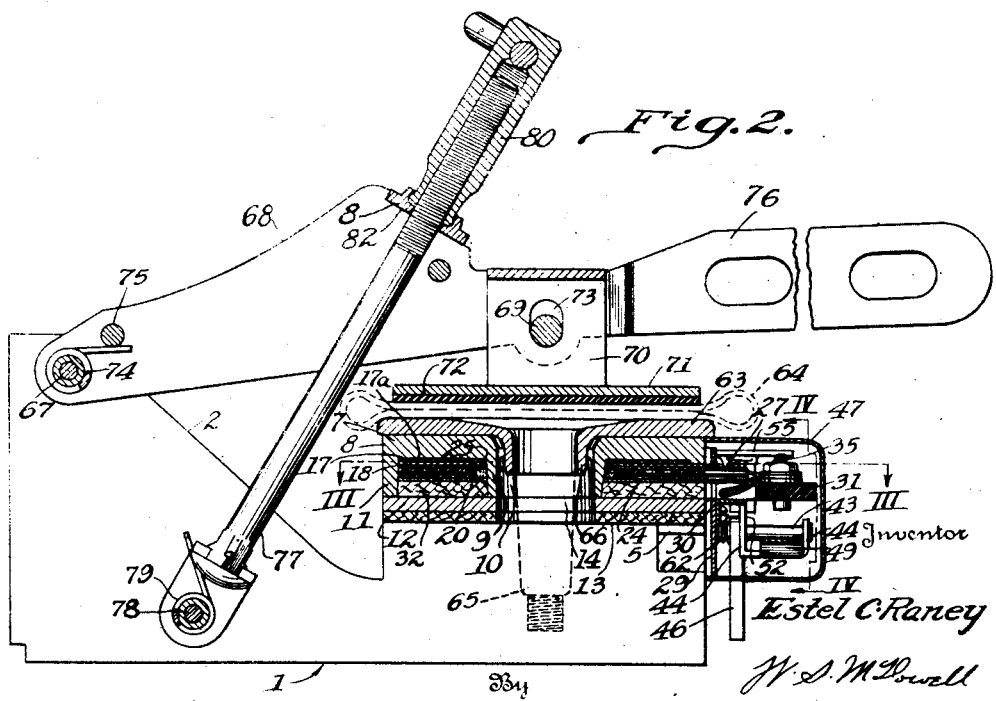
Fig. 2 is a vertical sectional view taken through the vulcanizer and disclosing the stationary and movable shoes thereof in closed order and in engagement with the rubber article undergoing vulcanization.

Removably positioned on the upper surface of the base member 8 is a heat applying shoe plate 63. This plate in the form thereof illustrated in Fig. 2, is composed of a heat conducting metal, such as aluminum alloy and rests directly on the base 8 to receive the heat of the latter. When the vulcanizer is employed to repair tire inner tubes, of the type indicated at 64, in the region of the air admitting and releasing valves 65 thereof, the plate 63 is provided with a depending collar 66, which is receivable in the axial opening 10 of the base 8. The collar 66 may be provided with projections or shoulders 66a, which are received within bayonet slots formed in connection with the walls of the opening 10, whereby to positively retain the shoe plate against accidental withdrawal. When the vulcanizer is employed in connection with portions of an inner tube, other than the region of the valve 65 thereof, a shoe plate 63a, formed without the central opening therein to present a smooth uninterrupted upper surface as shown in Fig. 12, is employed. Either of these types of shoe plates may be substituted for one another at will.

To apply pressure to the rubber article positioned on the shoe plate while the article is undergoing vulcanization, the vertical side walls 3 of the frame is pivotally connected as at 67 with a manually operated lever 68. This lever comprises a pair of duplicate sections which move as a unit for swinging movement in a vertical plane. The spaced intermediate portions of said lever pivotally support as at 69 the U-shaped bail 70, which has its lower end secured to an upper pressure plate or disk 71, the under surface of the latter being faced with a cushion 72 of compressible or resilient material. The bail 70 is provided with an elongated slot 73 which receives the pivot pin 69 of the lever 68, thus enabling the pressure plate to adapt itself readily to the configuration of the rubber article confined between the same and the shoe plate 63. A spring 74 surrounds the pivotal connection 67 of said lever and is cooperative with the pin 75 carried by said lever so that the normal tendency of the spring 74 will be to raise the lever to its inactive position, and the outer end of the lever is formed with a hand grip 76 by which the lever may be grasped and moved downwardly against the operation of the spring 74.

To maintain the levers and their associated pressure disks in their lowered or pressure applying positions, the frame 1 is provided with a threaded bolt 77, which is pivotally mounted as at 78 in connection with the frame 1, the pivot 78 being provided with a spring 79, which operates on the bolt to swing the same forwardly. The upper end of the bolt receives a manually rotated nut 80, which engages with a washer 81 at its lower end. By tightening the nut, the washer 81 will be maintained in firm engagement with a seat 82 formed in connection with the upper edges of the sections of the lever 68, whereby to maintain said lever in its lowered position and to secure the desired degree of pressure on the rubber article undergoing vulcanization. By loosening the nut 80 and freeing the washer 81 from engagement with the seat 82, the bolt 77 may be swung to a position clear of the lever, thus allowing the latter to lift in response to the influence of its spring 74.

In view of the foregoing, it will be apparent that the present invention provides a compact, reliable and efficient vulcanizer which is especially adapted for use in garages, tire shops and the like for the repair of tire inner tubes and other rubber articles. The construction of the vulcanizer is such as to provide for facility in the use or handling thereof. Following the clamping of the article to be vulcanized between the pressure and shoe plates of the vulcanizer, it is then merely necessary to actuate the switch to close the circuit through the primary heating coil. When the switch is moved to its position of closure, it is automatically retained therein and the primary heating coil is energized for a sufficient period of time until a predetermined vulcanizing temperature is attained. At this point, the thermostatic release mechanism functions to automatically release the switch and cause it to assume its open position. When the vulcanizer is inactive, and yet connected with a source of current supply, a minor degree of heating thereof will take place by the passage of current through the secondary coil which becomes heated to a sufficient degree to prevent the undesired complete cooling of the vulcanizer. This enables successive vulcanizing operations to be carried out expeditiously and with but a minimum loss of time.

Without the use of the insulating member 17a between the heater element and the base, it has been found that on initial energization of the vulcanizer when the thermostatic strip and the base are at atmospheric temperature the base member assimilates heat much more rapidly than the thermostatic strip and consequently when the thermostatic strip attains the temperature at which it is set to operate to open the switch circuit the temperature of the base is considerably above the temperature of the strip and overheating of the material undergoing vulcanizing is likely to occur. On subsequent operations the thermostatic strip will have had time to attain the temperature of the base and the switch will then be operated at substantially the same temperature as that of the base. To overcome this difficulty the disk of asbestos 17a is interposed between the heating element and the base which prevents rapid heat transfer to the base so that the heat may be assimilated by the thermostatic strip at the same rate as the heat is transferred to the base, so that on initial energization of the vulcanizer the thermostatic strip will always be at substantially the same temperature as the base member and the switch will operate at a substantially constant cut-out temperature whether the apparatus is warm from prior use or warm from heating of the high resistance coil.

While I have described what I consider to be the preferred form of the present invention, nevertheless it will be understood that the latter is subject to certain modification and variation from the form herein specifically illustrated and described, without necessarily departing from the scope of the invention as the latter has been defined in the following claims.

What is claimed is:

1. In an electric vulcanizer, a shell having a relatively thick vulcanizing wall and a recess therein, a heating element for heating said wall and positioned adjacent to said wall, a switch for controlling the flow of current through said heating element and positioned exteriorly of the shell, a thermostatic element located in said recess so that said thermostatic element is substantially between the heating element and said wall, and a member of heat insulating material interposed between said heating element and said wall.

2. In an electric vulcanizer, a shell having a relatively thick vulcanizing wall and an elongated recess therein, a heating element for heating said wall and positioned adjacent to said wall, the surface of which bridges said recess, a switch positioned on the exterior of said shell for controlling the flow of current through the heating element, and a thermostatic element for controlling the operation of the switch positioned within said recess in heat receiving relation to the wall.

3. In an electric vulcanizer, a heater unit comprising a casing having a vulcanizing wall, an electric resistance arranged within said casing and adjacent the vulcanizing wall thereof, a main circuit for said resistance, a shunt circuit providing for current flow through a portion of the total resistance, a normally open switch for said shunt circuit and mounted on the exterior of said casing, spring means normally maintaining said switch in its open position, manually operated means for moving said switch against the resistance of said spring means to its position of circuit closure, a spring latch engaging said switch for retaining the latter in its position of circuit closure, and a thermostat, thermally associated with the casing and extending beyond the casing, the extended end of the thermostat being arranged to actuate said latch to release said switch and restore the same to its normally open position when said casing has been heated to substantially a predetermined temperature.

4. In an electric vulcanizer, a heating unit comprising a casing having a vulcanizing wall, primary and secondary resistors mounted within said casing in heat transmitting relationship with the vulcanizing wall thereof, a main electric circuit in which said resistors are normally situated in series, a shunt circuit connected with said main circuit and operable when completed to divert current from the secondary resistor and to pass current solely through the primary resistor, a manually operated, normally open switch for said shunt circuit, said switch being detachably mounted on the exterior of said casing, a spring latch engaging said switch for positively retaining the same in its position of circuit closure, and a bi-metallic thermostat arranged in said casing and extending through the casing, said thermostat being adapted to release said latch to open said switch to destroy the shunt circuit when said casing attains a substantially predetermined temperature.

5. In an electric vulcanizer, a casing having a relatively thick wall adapted to be used as a vulcanizing shoe; a recess within the wall; a heating element for heating said wall and positioned adjacent to said wall; a switch for controlling the flow of current through said heating element and positioned exteriorly of the casing; a thermostatic element positioned in said recess so that said thermostatic element is substantially between the heating element and the wall, said thermostat controlling the action of the switch; a member of insulating material covering the recess; a plate of conductive material of substantially the same shape as the heating element placed against said insulating member; and a second member of insulating material disposed between conductive plate and said heating element.

6. In an electric vulcanizer; a casing having a relatively thick wall adapted to be used as a vulcanizer shoe; an elongated recess within said wall; a heating element adjacent said wall for heating the wall; a switch mounted exteriorly of the casing for controlling operation of said heating element; a thermostat for controlling the operation of the switch, said thermostat being positioned within said recess so that it is substantially between the heating element and the wall and having one end thereof fixedly mounted to the relatively thick wall of the casing so that the thermostat is responsive to the temperature of the said wall.

7. In an electric vulcanizer, a casing forming a vulcanizer shoe on one side thereof; a heating element disposed contiguous to the shoe on the underside thereof; a switch mounted on the exterior of the casing; a terminal block including a plurality of terminals electrically connected with the switch; electrical connecting means for the heating element extending through the casing and connected to the said terminals; resilient means for maintaining said switch in the open position; a latch lever adapted to latch said switch in the closed position; and a thermostat supported at one end by said shoe and extending through said casing, said thermostat being disposed to trip said latch when the shoe reaches a predetermined temperature to allow the said resilient means to open said switch.

ESTEL C. RANEY.